United States Patent [19]

Salzmann

[11] 4,236,549
[45] Dec. 2, 1980

[54] BLEEDER KIT FOR BLEEDING A MASTER CYLINDER

[75] Inventor: Donald F. Salzmann, Northbrook, Ill.

[73] Assignee: Autoline Supply Company, Chicago, Ill.

[21] Appl. No.: 905,184

[22] Filed: May 12, 1978

[51] Int. Cl.³ .............................................. B60T 17/00
[52] U.S. Cl. ...................................... 137/343; 60/584; 137/844; 188/352
[58] Field of Search .......................... 60/584; 188/352; 137/343, 844

[56] References Cited

U.S. PATENT DOCUMENTS

| | | | |
|---|---|---|---|
| 1,985,812 | 12/1934 | Banas | 188/352 X |
| 2,009,433 | 7/1935 | Carroll | 60/584 |
| 2,069,606 | 2/1937 | Gary et al. | 60/584 X |
| 3,325,996 | 6/1967 | Smith | 60/584 X |
| 4,170,280 | 10/1979 | Schwarz | 60/584 X |

FOREIGN PATENT DOCUMENTS 231380 4/1959 Australia ................................ 188/352
896769 11/1953 Fed. Rep. of Germany ........... 188/352

*Primary Examiner*—Gerald A. Michalsky
*Attorney, Agent, or Firm*—Fitch, Even, Tabin, Flannery & Welsh

[57] ABSTRACT

A bleeder kit for use in bleeding a master cylinder in a hydraulic brake system is disclosed wherein the kit includes a number of unidirectional flow valves and a corresponding number of flexible conduits suitable to connect a valve to each outlet port on the master cylinder housing, with a flow conduit connected to each valve so as to unidirectionally direct brake fluid from the master cylinder bore into the master cylinder reservoir upon pressurization of the brake fluid within the master cylinder. A hose clip is releasably mountable on the reservoir and operative to guide the discharge ends of the flow conduits into the reservoir.

7 Claims, 5 Drawing Figures

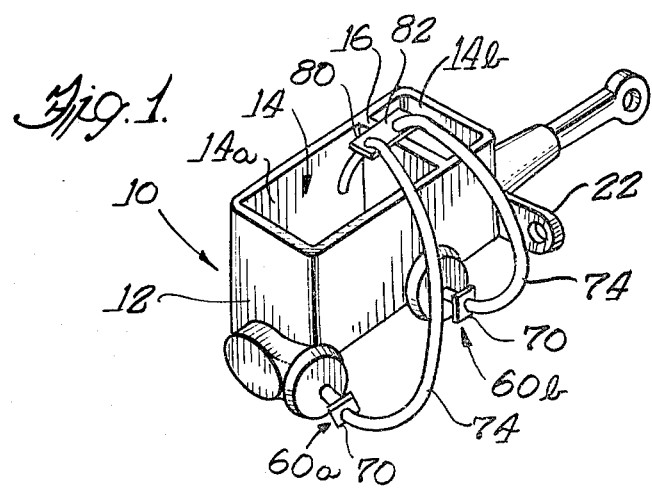
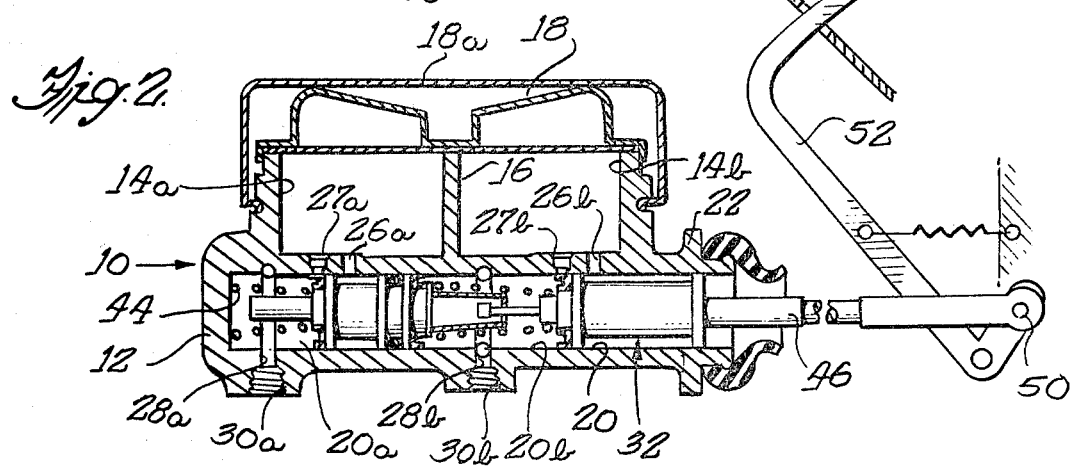
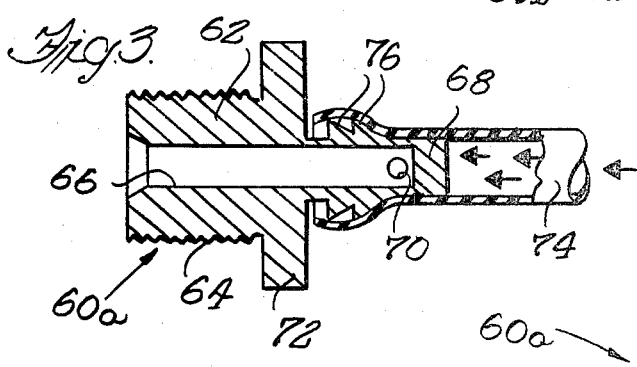
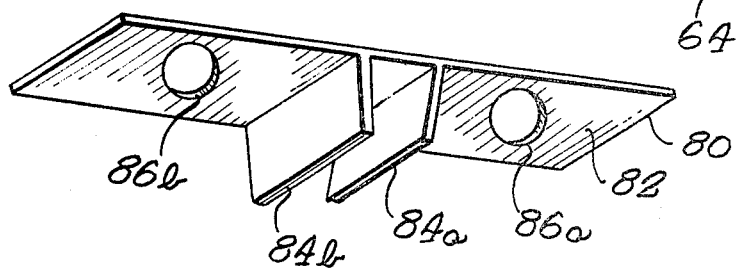

BLEEDER KIT FOR BLEEDING A MASTER CYLINDER

The present invention relates generally to apparatus for bleeding master brake cylinders, and more particularly to a novel bleeder kit for bleeding a master cylinder of the type employed in vehicle brake systems, the bleeder kit being particularly adapted for use in bleeding a master cylinder as employed in disc type brake systems while the cylinder is installed on a vehicle.

It is a conventional practice during original installation, and also during subsequent maintenance and servicing, of master cylinders of the type employed in vehicle brake systems to "bleed" the master cylinder prior to installation on a vehicle and, in accordance with better practice, also after the master cylinder has been installed on the vehicle. By "bleeding" the master cylinder is meant the procedure by which air entrapped in the cylinder bore and any air bubbles entrained within the brake fluid while filling the master cylinder reservoir are removed from the fluid. Trapped air compresses under pressure and prevents a full firm brake pedal.

Typically, in bleeding a master cylinder of the type used in disc brake systems when the cylinder is removed from a vehicle, the master cylinder is placed within a fixture, such as a vise. Flow conduits are connected to the fluid pressure outlets on the cylinder, usually one or two in number, and the free ends of the conduits are positioned to discharge pressurized brake fluid from the master cylinder bore back into the reservoir. The master cylinder piston is repeatedly stroked to pressurize the brake fluid within the bore or working chamber and force the brake fluid outwardly through the outlets and back into the reservoir, such repeated pressurization of the braking fluid serving to expel the entrained gas bubbles.

One drawback in the aforenoted technique for bleeding master cylinders as employed with disc type brakes is that the operator must use one hand to actuate the master cylinder piston while using his other hand to pinch off the bleed line or lines during each retraction of the piston to its retracted or outer position so as to prevent backflow of the brake fluid through the bleed lines. A similar problem exists when bleeding a disc brake type master cylinder while installed on a vehicle, e.g., the operator must manually actuate the master cylinder piston and coordinate pinching off of the bleed line or lines connecting the master cylinder bore to the reservoir so as to prevent reverse flow of brake fluid within the bleed lines.

In either of the aforesdescribed techniques, it is difficult to both actuate the master cylinder piston and simultaneously pinch off the bleed line or lines so as to prevent backflow of brake fluid through the bleed lines. There thus exists a need for a method and means for conveniently and easily bleeding master cylinders as employed in disc brake systems wherein the bleeding may be performed relatively quickly and without requiring manual pinching off of bleed lines.

Accordingly, one of the primary objects of the present invention is to provide a novel bleeder kit for bleeding a master cylinder as employed in a disc brake type vehicle brake system while the master cylinder is removed from the vehicle or installed on the vehicle.

A more particular object of the present invention is to provide a novel bleeder kit for bleeding a master cylinder as employed in a vehicle brake system wherein the master cylinder has at least one outlet facilitating connection of a fluid pressure line for normally transmitting fluid pressure from the master cylinder to a wheel brake actuating cylinder or the like, the kit including a unidirectional flow valve adapted for releasable connection to each of the master cylinder outlets, and a corresponding number of bleeder conduits adapted for connection to the unidirectional valves so as to transmit pressurized brake fluid from the bore or working chamber of the master cylinder to the cylinder reservoir upon actuation of the cylinder piston while preventing backflow through the bleeder conduits.

A feature of the bleeder kit of the present invention lies in the provision of a hose clip adapted to be releasably connected to the master cylinder housing and to which the free ends of the bleeder lines may be connected so as to position the discharge ends of the bleeder lines in positions to discharge brake fluid into the master cylinder reservoir.

Further objects and advantages of the present invention, together with the organization and manner of operation thereof, will become apparent from the following detailed description of the invention when taken in connection with the accompanying drawing wherein like reference numerals designate like elements throughout the several views, and wherein:

FIG. 1 is a perspective view of a master cylinder having the elements of a bleeder kit in accordance with the present invention connected thereto for bleeding the master cylinder;

FIG. 2 is a longitudinal sectional view, on an enlarged scale, taken through the master cylinder of FIG. 1 without the bleeder kit elements connected thereto and with a sealing cap thereon, the outlets in the housing being rotated approximately 90° about the longitudinal axis of the housing from their actual positions for purposes of clarity;

FIG. 3 is a fragmentary sectional view, on an enlarged scale, of a unidirectional valve employed in the bleeder kit of the present invention;

FIG. 4 is a fragmentary sectional view similar to FIG. 3, but showing the valve in a condition of flow from the valve through an associated bleeder line; and FIG. 5 is a perspective view, on an enlarged scale, of the hose clip shown in FIG. 1.

Referring now to the drawing, and particularly to FIGS. 1 and 2, a master cylinder of the type with which the bleeder kit of the present invention finds application is indicated generally at 10. The master cylinder 10 is of known design and is representative of master cylinders employed in disc brake type motor vehicle braking systems. It will be understood that the master cylinder 10 is illustrated for descriptive purposes only, and that present invention finds application with other master cylinder designs.

The master cylinder 10 includes a housing 12 which defines a fluid reservoir 14 adapted to contain a quantity of brake fluid. In the illustrated embodiment, the fluid reservoir 14 is divided by a partition wall 16 so as to establish two separate reservoir chambers 14a and 14b. The reservoir chambers 14a, b open upwardly of the housing and are accessible through such openings. In normal use, a cover 18 is mounted on the upper end of the reservoir 14 and is releasably retained thereon by a U-shaped retainer wire or clip 18a, as shown in FIG. 2.

The master cylinder housing 12 defines a substantially cylinder bore or working chamber 20 open at one end of the housing and closed at the opposite end thereof. The housing 12 adjacent the open end of the working chamber preferably includes a flange 22 with facilitates mounting of the master cylinder assembly on a vehicle. The bore 20 has communication with the brake fluid reservoirs 14a and 14b through ports 26a and 26b, respectively, so that brake fluid may flow from the reservoir chambers into the working chamber. Ports 27a and 27b are provided to relieve pressure within the bore when the associated brakes are released, as is known.

The housing 12 defines a pair of outlet ports 28a and 28b which have direct communication with the bore 20 and are suitably threaded within their outer ends at 30a and 30b to facilitate connection of conventional fittings thereto for connecting separate fluid pressure conduits or lines between the master cylinder and the front and rear pairs of wheel disc brake cylinders, respectively, as is known. While the master cylinder 10 is illustrated as having a pair of outlets 28a, b, it will be understood that a single outlet might be employed having connection to all four wheel brake cylinders on a motor vehicle, or, alternatively, more than two outlet ports might be employed.

To effect pressurizing of brake fluid within the working chamber or bore 20, the master cylinder includes piston means 32 axially movable within the working chamber and having annular lands formed thereon which define pressure chambers 20a and 20b having selective communication, respectively, with the reservoir chambers 14a, b and the outlet ports 28a, b.

A coil compression spring 44 is disposed between the closed end of the bore 20 and the inner end of the piston means 32 to normally urge the piston to an axially outward position relative to the bore 20. In operation, the spring 44 urges the piston means 32 outwardly against the inner end of an actuating rod or linkage 46 having one end secured to the piston means and its opposite end pivotally connected at 50 to a brake pedal lever 52 or power assist unit which facilitates operator movement of the piston 32 inwardly within the working chamber against the biasing force of spring 44.

The master cylinder 10 is operative upon actuation of the foot lever 52 or power assit unit to move the piston means 32 in a direction to cut off the ports 26a, b and pressurize the brake fluid within the chamber 20a, b so as to force the pressurized fluid outwardly through the outlets 28a, b to individual wheel brake cylinders or calipers (not shown) for applying the wheel brakes of the associated vehicle. Conversely, release of a braking force from the brake pedal lever 52 allows the spring 44 to return the piston 32 to the position shown in FIG. 2 relieving the fluid pressure from the brake lines and thereby facilitating return of the individual wheel brake cylinders or calipers to their non-braking conditions.

As aforementioned, in originally installing a master cylinder on a vehicle, or during subsequent maintenance and servicing thereof, it is desirable that the master cylinder to bled so as to remove gas entrapped in the bore 20 and gas bubbles which might be entrained within the brake fluid. In accordance with the present invention, a bleeder kit is provided for use in bleeding the master cylinder 10 in a relatively quick and efficient manner. The bleeder kit of the present invention is particularly useful for bleeding a master cylinder as employed in disc brake type vehicle braking systems, or master cylinders manufactured without residual pressure check valves, and while the master cylinder is installed on a vehicle.

In accordance with the illustrated embodiment, the bleeder kit of the present invention includes a pair of adapter valves 60a and 60b. The adapter valves 60a, b are similar except for different sizing as may be necessary to mate with the threaded outlet ports in the master cylinder with which the kit of the invention may be used. Taking adapter valve 60a as representative of the adapter valves 60a, b and with particular reference to FIGS. 3 and 4, each of the adapter valves includes a valve body 62 having an external thread 64 formed thereon to facilitate mounting on the master cylinder housing 12 through connection with the tapped outlet ports 30a and 30b. The valve body has an axial flow passage 66 therein which intersects the base or externally threaded end of the valve housing and terminates at its opposite end within an axial cylindrical connector end 68. A cross passage 70 is formed transversely through the connector end 68 and intersects the axial flow passage 66 to facilitate flow communication from the axial passage to externally of the connector end. A wrench flange 72 is formed on the valve body 62 intermediate the threaded end 64 and the connector end 68 to facilitate mounting of the valves on the cylinder housing 12.

Each of the valves 60a, b is adapted to have a length of flexible bleeder line tubing or hose 74 connected thereto. To this end, each connector end 68 has a plurality of annular ribs or ridges 76 formed thereon having outer diameters greater than the inner diameter of the associated flexible bleeder line 74 so that the end of the bleeder line may be stretched over the annular ribs and frictionally retained thereon.

The bleeder lines 74, which are preferably elastomeric, have inner diameters approximately equal to the diameters of the connector ends 68 of the unidirectional valves 68a, b so that when the bleeder lines are mounted on the valve connector ends 68, the lines normally close off the cross bores 70. When the brake fluid within the axial bores 66 is pressurized by stroking the piston means 32, the fluid pressure expands the associated bleeder line 74 outwardly from the corresponding valve connector end 68 and facilitates flow through the valve and corresponding bleeder hose, as best seen in FIG. 4. When the fluid pressure is again reduced within the bores 66, the corresponding bleeder lines 74 return to their relaxed positions again blocking off the cross bores 70 and preventing reverse flow of brake fluid from the bleeder lines through the valves. In this manner, the valves 60a, b act as unidirectional valves.

As best seen in FIG. 1, the bleeder lines 74 are of sufficient length to extend from the adapter valves 60a, b upwardly into the reservoir chambers 14a, b. To position the free ends of the bleeder lines, the kit of the present invention includes bracket means in the form of a hose clip 80 adapted to be releasably mounted on the partition wall 16 of the master cylinder housing. The hose clip 80 includes a support plate 82 on which is formed a pair of depending legs 84a, b as shown in FIG. 5. The hose clip 80 is preferably made of a suitable plastic material and the mounting legs 84a, b are angled toward each other from planes normal to the plane of the plate 82. The legs 84a, b are spaced sufficiently to facilitate receipt of the partition wall 16 therebetween in frictional supporting relation therewith.

The support plate 82 has a pair of circular openings 86a and 86b formed therethrough which have diameters suitable to receive the free ends of the bleeder lines 74 therethrough in frictional retaining relation. By mounting the hose clip 80 on the partition wall 16, the free ends of the bleeder lines may be inserted through the openings 86a, b and retained in desired positions relative to the reservoir chambers 14a, b.

In operation, the adapter valve 60a, b are threadedly secured to the outlets 30a, b of the master cylinder housing 12, preferably prior to attachment of the master cylinder piston means 32 to a vehicle power brake unit or to the illustrated brake actuating rod 46 shown in FIG. 2. The bleeder lines or hoses 74 are then connected to the unidirectional valves 60a, b and their free ends are inserted through the openings 86a, b in the hose clip 80 which may then be releasably mounted on the partition wall 16 so that the free ends of the bleeder lines are directed into the reservoir chambers 14a, b. The brake pedal is then actuated to stroke the piston 32 axially inwardly to compress the brake fluid disposed within the pressure chambers 20a, b and effect outward flow of pressurized brake fluid through the outlet ports 28a, b. As the piston means 32 moves in a direction to pressurize the brake fluid, the pressurized fluid passing through the passages 66 in the valves expands the bleeder lines 74 peripherally of the connector ends 68 to open the cross passages 70 allowing flow of the brake fluid through the bleeder lines into the reservoir chambers 14a and 14b. Release of the brake pedal allows return of the piston 32 through operation of the spring 44, with the associated bleeder lines 74 closing about the valve connector ends 68 and closing off the cross passages 70 whereby to prevent return flow of brake fluid from the bleeder lines into the pressure chambers 20a, b.

Repeated stroking of the master cylinder piston means effects repeated pressurizing of the brake fluid disposed within the working chamber 20 and causes it to circulate from the working chamber to the reservoir during which any gas within the working chamber and gas bubbles entrained within the brake fluid are dissipated. In this manner, a relatively quick and simple bleeding of the master cylinder may be obtained by an operator positioned within the operator compartment without need for manually manipulating or pinching off the bleed lines during a bleeding operation.

While a preferred embodiment of the bleeder kit in accordance with the present invention have been illustrated and described, it will be understood to those skilled in the art that changes and modifications may be made therein without departing from the invention is its broader aspects.

Various features of the invention are defined in the following claims.

What is claimed is:

1. A bleeder kit for use in bleeding a master cylinder of the type employed in a vehicle brake system, the master cylinder including a housing defining a fluid reservoir accessible from externally of the housing and adapted to contain a quantity of brake fluid which may have gas bubbles entrained therein, said housing further defining a working chamber adapted to receive fluid from the reservoir and having at least one outlet communicating with the working chamber, and means cooperable with said working chamber and adapted to effect pressurizing of brake fluid disposed therein, said bleeder kit comprising, at least one adaptor valve comprising a unitary valve body having an internal flow passage and being adapted to be mounted on said housing so that said internal flow passage is in communication with said housing outlet, said unitary valve body having a connector end in which is formed a substantially transverse cross passage intersecting said flow passage and opening externally of said connector end, a flexible fluid bleeder tube having an end adapted to be received axially over said connector end of said valve in snug fitting relation thereon and having an internal configuration adapted to normally close off said external opening of said cross passage, said bleeder tube having sufficient length to extend from said valve to said reservoir when said valve is mounted on said housing, bracket means adapted for mounting on said housing and having means facilitating cooperation with said bleeder tube to position an end thereof opposite said valve so as to discharge fluid from said tube into said reservoir, said valve when mounted on said housing and having said end of said bleeder tube received over said connector end being cooperative with said tube to facilitate flow of brake fluid from said working chamber through said tube into said reservoir upon actuation of said pressurizing means and being adapted to prevent fluid flow in an opposite direction through said external opening in said connector end of said valve, repeated pressurizing of said working chamber being operative to unidirectionally circulate said brake fluid from said working chamber to said reservoir during which gas bubbles entrained in the brake fluid are forced out of the fluid.

2. A bleeder kit as defined in claim 1 wherein said bracket means has at least one opening adapted to receive said flexible tube therethrough and frictionally retain the flexible tube therein.

3. A bleeder kit as defined in claim 1 wherein said housing defines a plurality of outlets, said kit including a corresponding number of said adaptor valves each of which is adapted to be mounted on the housing with its internal flow passage in flow communication with one of the housing outlets, said kit further including a corresponding number of said fluid bleeder tubes each of which has one end adapted for connection to the connector end of one of said adaptor valves when mounted on the housing and is further adapted for communication with the housing reservoir, said bracket means being adapted for cooperation with said corresponding number of bleeder tubes so as to position the ends of said tubes opposite their connections to said adaptor valves to discharge brake fluid from said tubes into said reservoir.

4. A bleeder kit as defined in claim 3 wherein said housing has a partition wall dividing the reservoir into at least two chambers each of which is adapted for communication with an outlet in said housing, said bracket means being adapted for mounting on the housing so as to guide each fluid flow conduit to a separate one of the reservoir chambers.

5. A bleeder kit as defined in claim 4 wherein said bracket means comprises a tube clip having a first portion facilitating releasable attachment of the clip to the housing, said clip having a second portion facilitating attachment of a bleeder tube thereto in guiding relation.

6. A bleeder kit as defined in claim 5 wherein said second portion of said clip defines at least one opening therein adapted to receive a fluid flow tube therethrough and retain the tube therein through frictional engagement therewith.

7. The bleeder kit as defined in claim 1 wherein said connector end of said valve body has at least one annular rib formed thereon having an outer diameter greater than the inner diameter of the associated bleeder tube so that the end of said bleeder tube received over said connector end is frictionally retained thereon.

* * * * *

UNITED STATES PATENT AND TRADEMARK OFFICE
CERTIFICATE OF CORRECTION

PATENT NO. : 4,236,549
DATED : December 2, 1980
INVENTOR(S) : Donald F. Salzmann It is certified that error appears in the above—identified patent and that said Letters Patent is hereby corrected as shown below:

Column 2, line 68, "cylinder" should be --cylindrical--;

Column 3, line 43, "assit" should be --assist--;

Column 3, line 58, "to" (first usage) should be --be--.

Signed and Sealed this

Ninth Day of June 1981

[SEAL]

Attest:

RENE D. TEGTMEYER

Attesting Officer

Acting Commissioner of Patents and Trademarks